United States Patent [19]

Suppelsa et al.

[11] Patent Number: 5,028,399
[45] Date of Patent: Jul. 2, 1991

[54] GAS MANIFOLD FOR SOLDER REFLOW PROCESSING ATMOSPHERE

[75] Inventors: Anthony B. Suppelsa, Coral Springs; Robert W. Pennisi, Boca Raton; Fadia Nounou, Plantation; James L. Davis, Tamarac, all of Fla.

[73] Assignee: Motorola, Inc., Schaumburg, Ill.

[21] Appl. No.: 464,259

[22] Filed: Jan. 12, 1990

[51] Int. Cl.$^5$ .......................... B01J 8/06; A21B 3/00
[52] U.S. Cl. ................... 422/211; 126/19 R; 126/20; 126/21 R; 126/21 A; 219/400; 422/180; 432/14; 432/198
[58] Field of Search ........ 422/310, 211, 312, 198–199, 422/170, 171, 177; 219/390–391, 400; 34/73–74, 78; 126/19, 20, 21; 432/14, 198, 200

[56] References Cited

U.S. PATENT DOCUMENTS

| | | | |
|---|---|---|---|
| 2,214,083 | 9/1940 | Lester | 422/310 X |
| 3,770,408 | 11/1973 | McCully | 219/400 X |
| 3,865,555 | 2/1975 | Elebracht et al. | 422/312 |
| 3,993,653 | 11/1976 | Blum et al. | 204/272 |
| 4,181,853 | 1/1980 | Abu-Shumays et al. | 422/69 X |
| 4,254,085 | 3/1981 | Wilson Jr. et al. | 422/179 |
| 4,256,700 | 3/1981 | Smith et al. | 422/171 X |
| 4,348,362 | 9/1982 | Foss | 422/171 |
| 4,419,329 | 12/1983 | Heller | 422/202 X |
| 4,627,946 | 12/1986 | Crabtree | 425/437 X |
| 4,898,202 | 2/1990 | Craig | 422/276 X |

OTHER PUBLICATIONS

The "Catalytic Decomposition of Formic Acid", by Mars, Scholten and Zweitering, Advances in Catalysis and Related Science, vol. 17; pp. 35–113 Academic Press, New York, 1963; is a compilation on existing knowledge on decomposition of formic acid and specifically page 104 lists the decomposition of formic acid at various temperatures.

The Condensed Chemical Dictionary, 8th Ed.; Van Nostrand Reinhold Company, New York; 1971, pp. 614 and 786.

Primary Examiner—Robert J. Warden
Assistant Examiner—Amalia L. Santiago
Attorney, Agent, or Firm—Michael J. Buchenhorner

[57] ABSTRACT

A manifold (10) for use in a gas solder-reflow oven (50) comprises a hollow tube made from a transition metal having an open end (18) for receiving gas, a closed end (16), and a plurality of holes (12).

5 Claims, 2 Drawing Sheets

GAS MANIFOLD FOR SOLDER REFLOW PROCESSING ATMOSPHERE

TECHNICAL FIELD

This invention relates generally to solder reflow systems, and more specifically to a solder reflow system that uses a gas manifold.

BACKGROUND

The formation of oxides on the metallic surfaces to be soldered in solder reflow processes presents a problem because such oxides prevent the solder from "wetting" the surface to be soldered. Soldering inside a reducing atmosphere (e.g., Hydrogen-based or Formic acid) solves the oxide problem by reducing the oxide on the metallic surfaces.

Solder reflow equipment with reducing atmospheres is known and used in industry. However, Hydrogen-based reducing atmospheres require extensive safety control systems to operate (because of the physical properties of hydrogen), and commonly-used Formic Acid atmosphere systems operate best above 250 degrees Centigrade, which can damage most PWB materials and electronic components.

Thus, there is a need for solder reflow equipment that will lower the effective decomposition temperature of Formic Acid, allowing low temperature reflow of tin-based alloys for electronic assembly applications.

SUMMARY OF THE INVENTION

Accordingly, it is an object of the present invention to provide a catalyst in the gas delivery system to overcome the problems associated with operation at high temperatures.

Briefly, according to the invention, a manifold, for use in a gas solder-reflow oven, comprises an open end for receiving gas, a closed end, and a plurality of holes therethough. The manifold is made from a transition metal.

DETAILED DESCRIPTION OF THE PREFERRED EMBODIMENT

Figure 1:
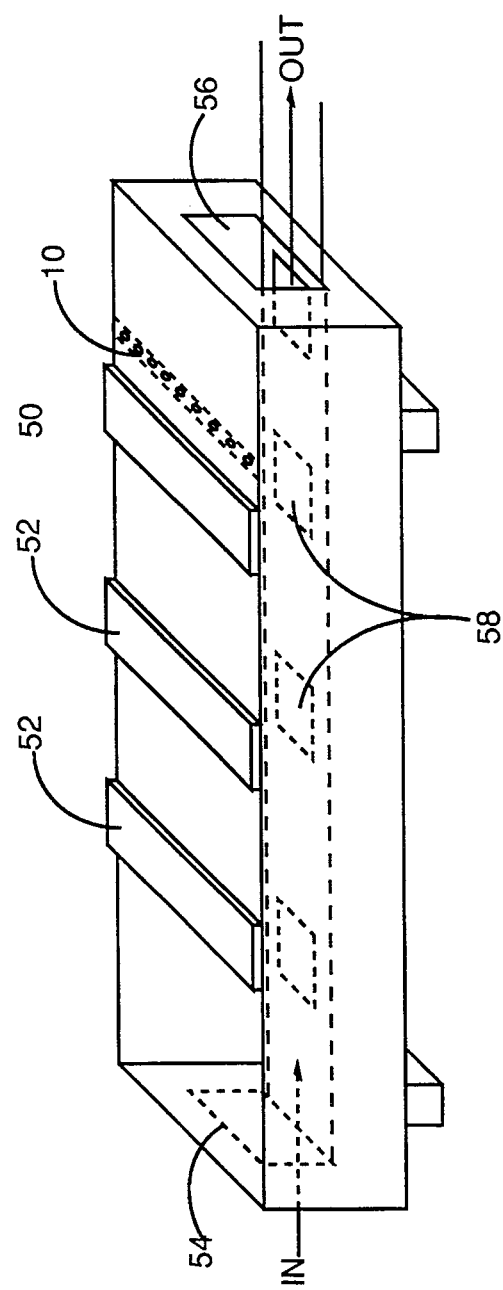
FIG. 1 shows a gas reflow oven, in accordance with the invention.

Referring to FIG. 1, there is shown a gas reflow oven 50 with a gas delivery system that includes a manifold 10. A plurality of heating elements 52 are disposed in the oven 50 for heating the gases or vapors therein. A plurality of printed circuit boards 58 (or other items) having metallic surfaces to be soldered are placed in the oven 50 through an input port 54 for reflow soldering, and removed from the oven 50 through an output port 56.

The gas distribution manifold 10 is usually positioned inside a reflow chamber in the oven 50, so as to heat an incoming reducing gas 20 in order to assist in its decomposition, and thus to effect proper reaction of the reducing disassociated gas molecules with metal and solder surfaces, in order to optimizer the solder interconnect process.

The manifold 10 is also positioned under an infrared heating panel 52. A low molecular weight organic acid vapor 20 is used to reduce the oxides on the metallic surfaces to be soldered so that the reflow soldering process may take place.

Figure 2:
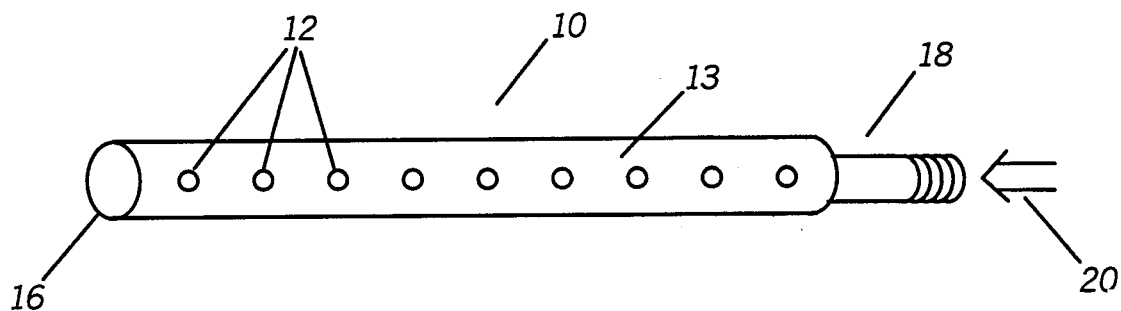
FIG. 2 shows a manifold for use in a gas reflow oven, in accordance with the invention.

Referring to FIG. 2, the manifold 10 is shown in greater detail. In its simplest version, the manifold 10 is a terminated stainless steel tube, with small holes 12 through the tube wall 13 positioned along its length so as to direct the incoming reducing vapor flow 20 onto the work surface 58 to be solder reflowed.

The reducing vapor 20 is introduced at an open end 18 of the manifold 10 and allowed to flow along the length of the manifold 10. The flow is interrupted by a closed end 16. This increases the pressure of the vapor 20 in the manifold 10. The openings 12 in the manifold 10 allow the reducing vapor to escape, thus applying the reducing vapor 20 to the articles 58 to be soldered.

According to the invention, the introducing of a catalyst into the manifold 10 allows the decomposition of the reducing vapor 20 at a lower temperature, thus allowing the reflow soldering process to be perfomed at a lower temperature.

According to a preferred embodiment, the entire manifold 10 is made from a transition metal (such as Copper, Nickel, or Silver). Thus, as the low molecular weight organic acid vapor 20 flows through the manifold 10 a catalytic process takes place allowing the decomposition of the vapor 20 to occur at a temperature lower than would be possible if the catalyst were not present. The present of the catalyst will effectively lower the dissociation temperature of the incoming gas stream, thus allowing the total reflow process to be performed at a lower temperature, and consequently eliminating the problems of performing the reflow soldering process at a higher temperature. Without the catalyst the decomposition point is approximately 250 degrees Centigrade; whereas with the catalyst it is at least 50 degree C. lower.

Figure 3:
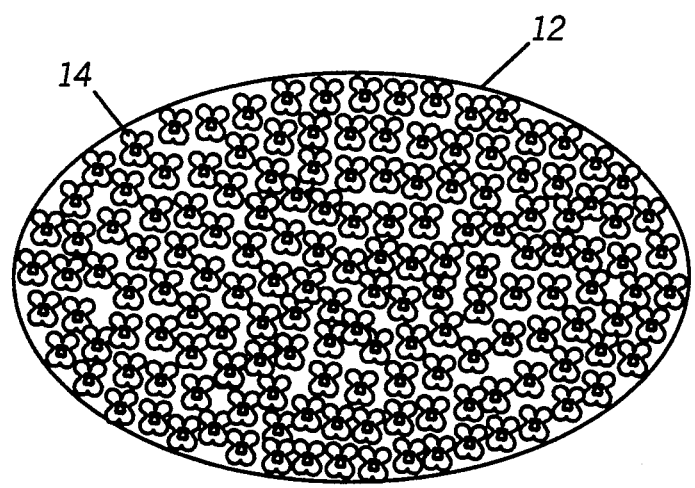
FIG. 3 shows a close-up view of an aperture in the manifold of FIG. 2.

Referring to FIG. 3, a hole 12 is shown filled with a porous catalyst 14. According to the invention, sintered powder metal catalytic plugs or nozzles 14 may be inserted into the existing manifold system. The nozzles 14 are made from a transition metal (such as Copper, Nickel, or Silver) and act as a catalyst in the non-catalyt stainless steel manifold 10.

What is claimed is:

1. A manifold for use in a gas solder-reflow oven, comprising:
    a hollow tube having an open end for receiving gas, a closed end, and at least one hole; and
    a sintered powder metal plug for fitting inside the hollow tube, the sintered powder metal plug acting as a catalyst for the decomposition of a low-molecular weight organic acid vapor.

2. The manifold of claim 1 wherein the sintered powder metal catalytic plug comprises copper.

3. The manifold of claim 1 wherein the sintered powder metal catalytic plug comprises nickel.

4. The manifold of claim 1 wherein the sintered powder metal catalytic plug comprises silver.

5. A gas solder-reflow oven, comprising:
    an oven housing having at least one opening;
    a heating element in the oven housing for heating the inside of the gas solder-reflow oven housing:
    a manifold tube mounted inside the oven housing, the manifold tube having an open end, a close end, and at least one hole; and
    a sintered powder metal plug, for fitting into the manifold, the sintered powder metal plug acting as a catalyst for the decomposition of a low-molecular weight organic acid vapor.

* * * * *